(12) United States Patent
Ruiz Rivas et al.

(10) Patent No.: US 11,701,891 B2
(45) Date of Patent: Jul. 18, 2023

(54) PRINTING SYSTEM

(71) Applicant: Hewlett-Packard Development Company, L.P., Spring, TX (US)

(72) Inventors: Victor Ruiz Rivas, Sant Cugat del Valles (ES); Sergi Culubret Cortada, Sant Cugat del Valles (ES); Esteve Comas Cespedes, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 219 days.

(21) Appl. No.: 17/264,332

(22) PCT Filed: Dec. 20, 2018

(86) PCT No.: PCT/US2018/066783
§ 371 (c)(1),
(2) Date: Jan. 29, 2021

(87) PCT Pub. No.: WO2020/131068
PCT Pub. Date: Jun. 25, 2020

(65) Prior Publication Data
US 2021/0300048 A1    Sep. 30, 2021

(51) Int. Cl.
*B41J 2/175* (2006.01)
*F16H 53/00* (2006.01)
*F16J 15/06* (2006.01)

(52) U.S. Cl.
CPC ............ *B41J 2/1752* (2013.01); *F16H 53/00* (2013.01); *F16J 15/06* (2013.01)

(58) Field of Classification Search
CPC ...... B41J 2/175; B41J 2/17506; B41J 2/1752; B41F 15/40; B41F 31/02; B41F 31/027; B41F 31/20; B41P 2231/20; F16H 53/00; F16J 15/06; G03G 15/0877; G03G 15/0886; G03G 15/0894; G03G 21/1676
See application file for complete search history.

(56) References Cited

U.S. PATENT DOCUMENTS

| 3,903,941 | A | 9/1975 | Eisenberg |
| 4,318,341 | A | 3/1982 | Pietsch et al. |
| 5,642,664 | A | 7/1997 | Schneider |
| 6,276,270 | B1 | 8/2001 | Leanna |
| 6,629,758 | B2 * | 10/2003 | Okamoto ............ B41J 2/17596 347/85 |

(Continued)

FOREIGN PATENT DOCUMENTS

| CN | 1136501 A | 11/1996 |
| CN | 205149208 U | 4/2016 |

(Continued)

*Primary Examiner* — Anh T Vo
(74) *Attorney, Agent, or Firm* — Shook, Hardy & Bacon, L.L.P.

(57) ABSTRACT

A printing system to hold printing material comprises a sealing interface to seal a container with respect to a printing chamber volume of the printing system, the container to hold the printing material. The printing system comprises a lifting system to move the container between a first position in which the container is to be lifted and a second position at which the container is lifted and contacts the seal so as to seal the container. The lifting system is to non-hyperstatically constrain the container.

15 Claims, 9 Drawing Sheets

(56) References Cited

U.S. PATENT DOCUMENTS

| | | | |
|---|---|---|---|
| 6,799,840 B2 | 10/2004 | Inamura | |
| 6,874,876 B2 * | 4/2005 | Ishizawa | B41J 2/17546 |
| | | | 347/85 |
| 6,991,325 B2 * | 1/2006 | Oda | B41J 2/17509 |
| | | | 347/85 |
| 7,537,549 B2 | 5/2009 | Nelson et al. | |
| 8,185,229 B2 | 5/2012 | Davidson | |
| 9,598,185 B2 | 3/2017 | Su | |
| 2008/0158311 A1 | 7/2008 | Kaga | |
| 2011/0169890 A1 | 7/2011 | Hara | |

FOREIGN PATENT DOCUMENTS

| | | |
|---|---|---|
| CN | 106541578 A | 3/2017 |
| DE | 2937037 A1 | 3/1981 |
| DE | 9216755 U1 | 2/1993 |
| DE | 9218055 U1 | 8/1993 |
| EP | 0635371 A2 | 1/1995 |
| JP | 2016218125 | 12/2016 |

\* cited by examiner

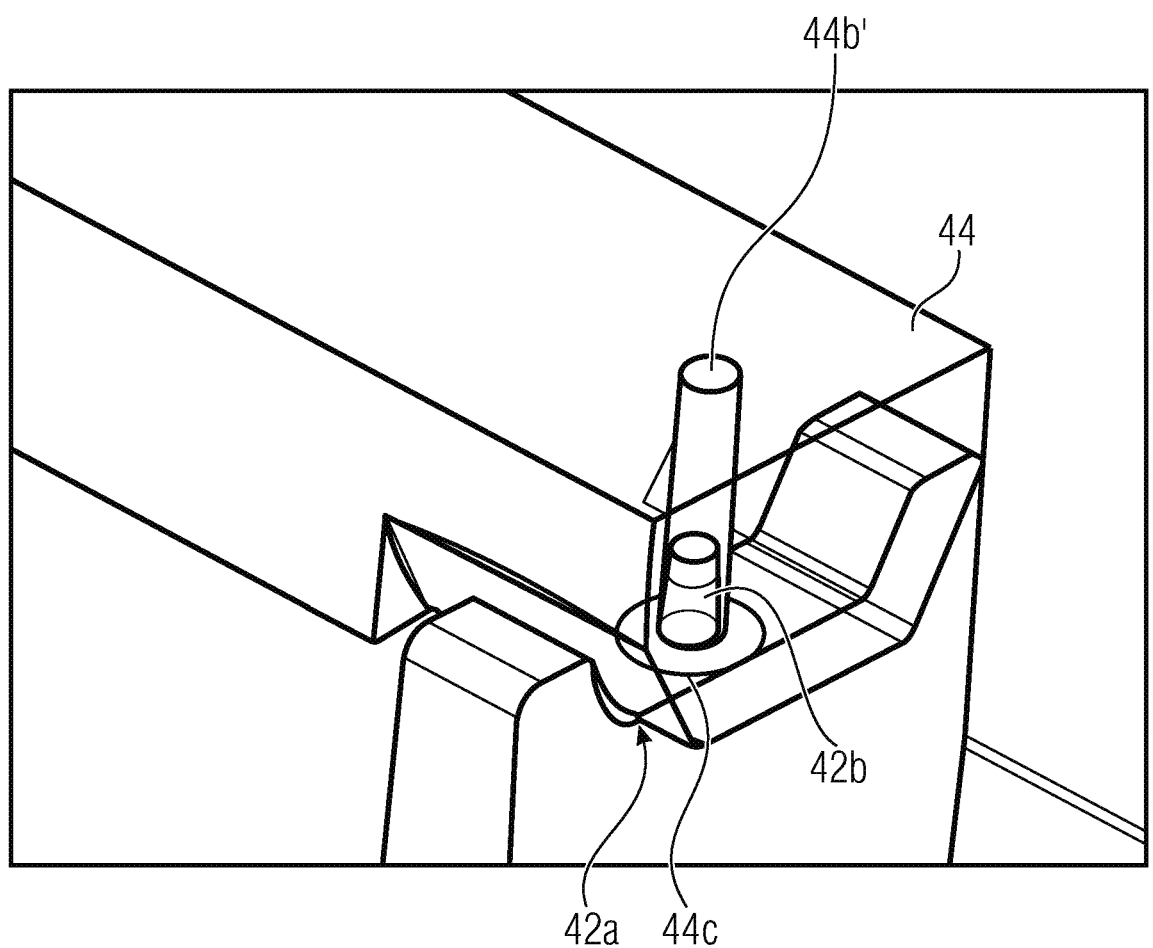
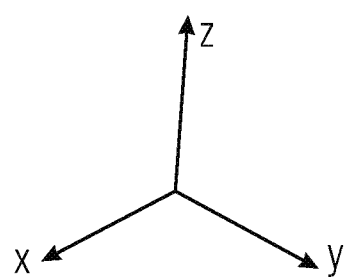
Fig. 3b

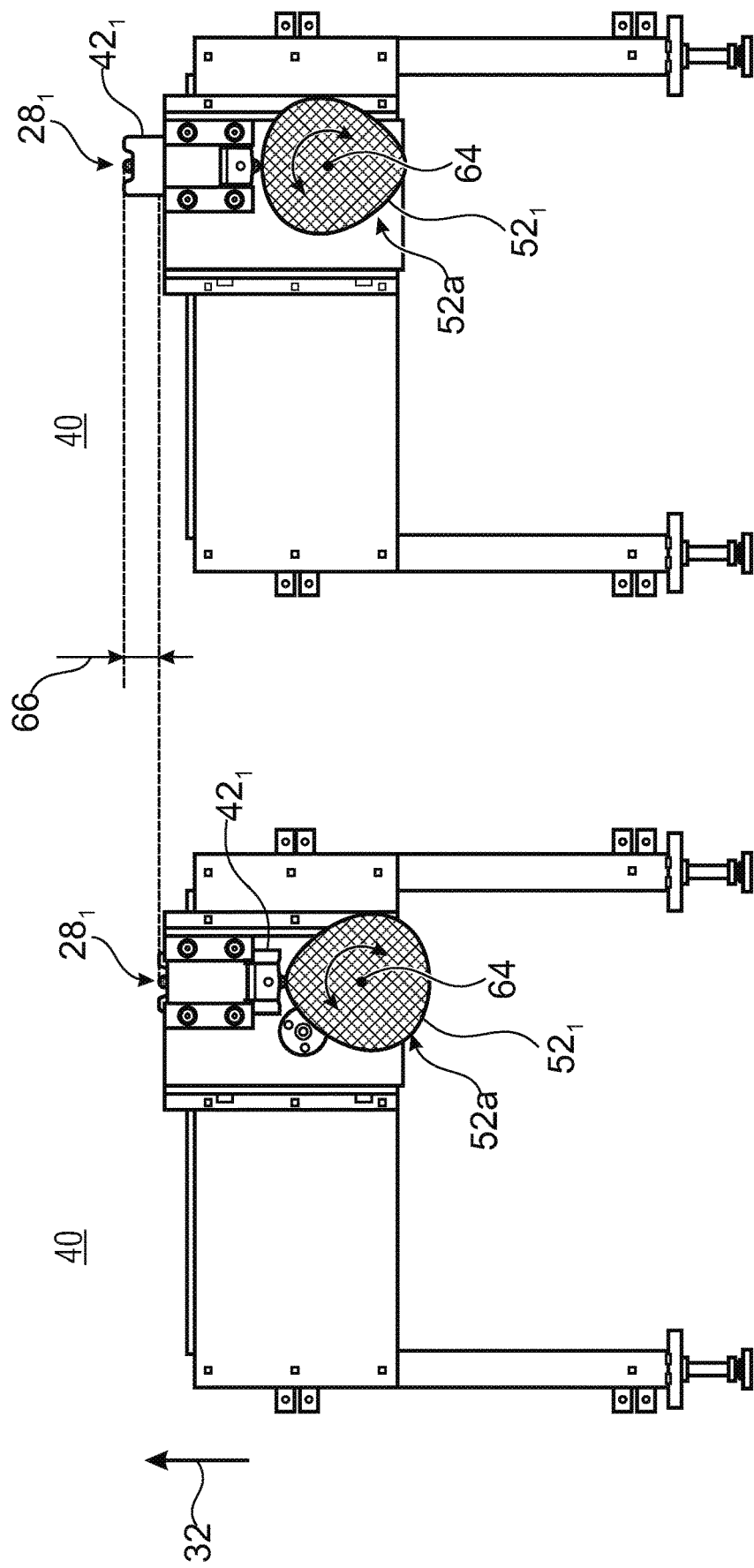

PRINTING SYSTEM

BACKGROUND

Printing systems may print dry or liquid printing material such as an ink, a toner and/or different dry printing material such as plastics and/or metal. The printing material may be held or stored in a respective container and disposed therefrom so as to be printed.

BRIEF DESCRIPTION OF THE DRAWINGS

Examples will now be described, by way of a non-limiting example only, with reference to the accompanying drawings, in which:

FIG. 3b shows a schematic perspective view of a second example engaging region;

FIG. 5a shows a schematic side view of an example cam of the printing system of FIG. 4 in a first end position of the cam;

FIG. 5b shows a schematic side view of the example cam of the printing system of FIG. 4 in a second end position of the cam;

DETAILED DESCRIPTION

Figure 1:
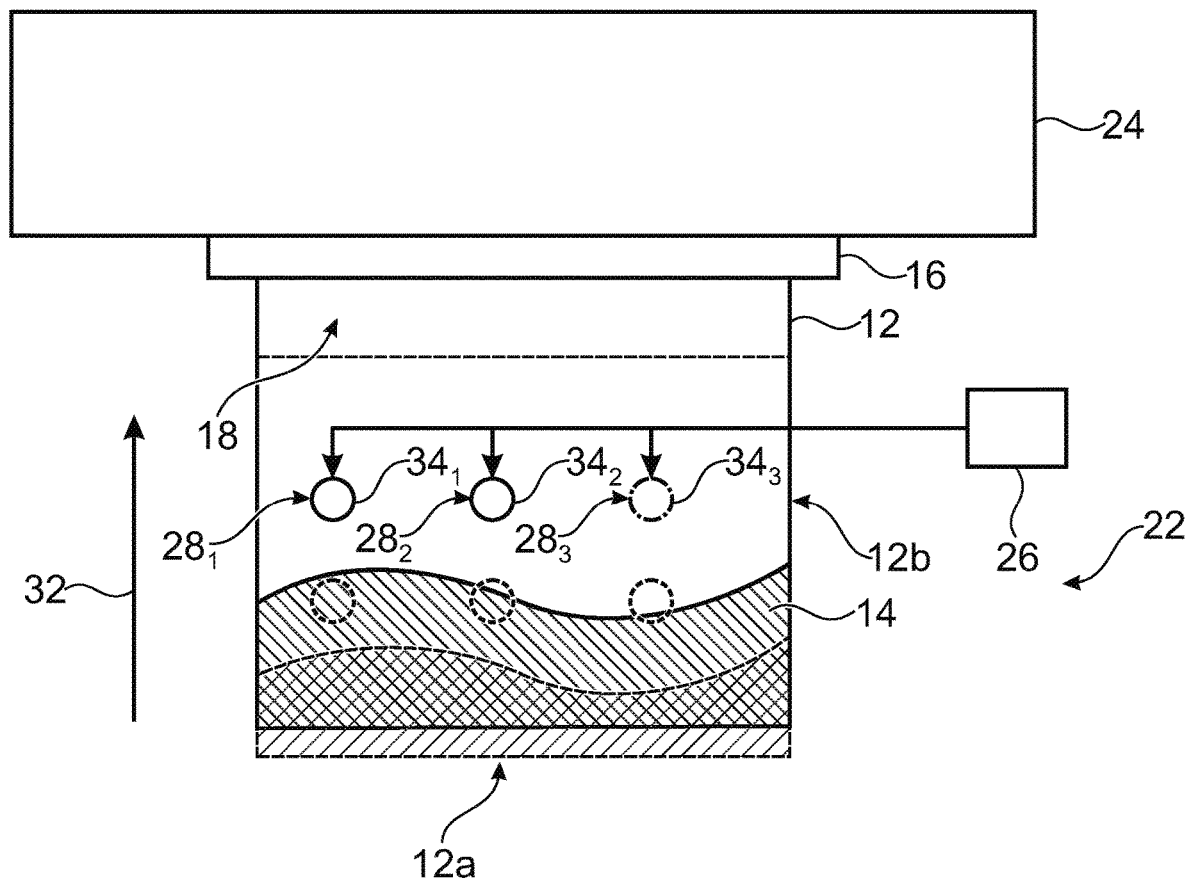
FIG. 1 shows a schematic block diagram of a printing system according to an example.

Equal or equivalent elements or elements with equal or equivalent functionality are denoted in the following description by equal or equivalent reference numerals even if occurring in different figures.

In the following description, a plurality of details is set forth to provide a more thorough explanation of examples of the present disclosure. However, examples of the present disclosure may be practiced without these specific details. In other instances, well-known structures and devices are shown in block diagram form rather than in detail in order to avoid obscuring examples of the present disclosure. In addition, features of the present examples described hereinafter may be combined with each other, unless specifically noted otherwise.

Examples described herein relate to a container holding, or to hold, a printing material used for printing. The printing material may comprise, for example, a metal powder. According to examples, further and/or different printing materials such as liquid and dry printing materials may be used such as inks, toners and/or different powders, e.g., plastic materials or the like.

Examples described herein relate to a container to hold printing material. Such a container may hold the printing material as a material that is provided or fed to a printing system as a new, fresh printing material. However, examples are not limited hereto, i.e., the container may also host printing material of a different source. For example, the printing material may be a recovered or recycled printing material, for example, being collected within the printing system, for example at a building section or printing section and being possibly recycled or reprocessed. Printing systems may use a seal that allows to prevent printing material to escape the container to an outside world or environment of the container. This may allow to limit or constrain input and/or extraction of the printing material to interfaces that are constructed for such purpose. When temporarily removing the container, the seal may be opened to allow the container to processed outside of the printer, for example to heating, cleaning, build material replacement, object removal, etc. Afterwards, the seal may be tightened or sealed again by contacting the seal with the container or a new container.

FIG. 1 shows a schematic block diagram illustrating a side view of a printing system 10 according to an example. The printing system 10 comprises a container 12 to hold printing material 14, e.g., a dry or liquid printing material. The container 12 may be formed, for example, by a wooden, plastic or metal material and may be considered as a ridged body.

The printing system 10 comprises a sealing interface or seal 16 to seal an interior 18 of the container 12 with respect to an outside 22 of the container 12. For example, the sealing interface may be arranged between a location at which the container 12 is to be arranged and a printing chamber volume of the printing system 10. That is, the sealing interface may seal the container with respect to the printing chamber volume. The seal 16 may allow the printing material 14 to travel from the interior 18 of the container 12 to other parts 24 of the printing system 10, e.g., via a tubing, to a printing unit and/or using components associated therewith. At the same time, the sealing 16 may reduce or prevent displacement of the printing material 14 to the outside 22.

The printing system 10 comprises a lifting system 26 comprising an actuator or a plurality of actuators to move the container 12. In the side view of FIG. 1 the container 12 may be moved between a first position 12a indicated by a dashed line and a second position 12b indicated by a solid line. Movement between the positions 12a and 12b may comprise a lifting, e.g., a vertical movement. Alternatively or in addition, the movement may comprise a lateral, e.g., horizontal movement. That is, according to an example, in the first position 12a, the container 12 may be in a position from which it is to be lifted into the second position or to which it is lowered from the second position 12b. The container 12 may be spaced apart from the seal 16 in the first position, e.g., during maintenance or replacement of the container 12. That is, in the first position, the container may be placed or located in a position to be lifted into the second position. At the second position 12b, the container 12 contacts the seal 16 so as to tighten the seal.

The lifting system 26 may support, guide or constrain the container 12 non-hyperstatically. For example, the lifting system 26 may engage the container 12 at exactly three constraining engaging regions $28_1$, $28_2$ and $28_3$. The exactly three constraining engaging regions are to be understood as the ones that constrain a movement of the container 12 but allow it to have further non-constraining regions such as compliant supports that are free of adding additional constrains. Such a compliant support may allow to support the container 12 at one or more regions whilst preventing additional constraints for the movement of the container. By way of example, the engaging region $28_3$ may be arranged at a back side of the container 12 and is thus represented by a dashed line. The engaging region $28_1$ and/or the engaging region $28_2$ may be arranged on an opposing side, e.g., a front side, so as to allow for a symmetric provision of forces to the container 12.

Engaging the container 12 at exactly there engaging regions $28_1$, $28_2$ and $28_3$ allows to move the container 12 along a moving direction 32 precisely. Using exactly three engaging regions $28_1$ and $28_3$ further allows to avoid or prevent a mechanically over-determined system and may thus allow to prevent mechanical impreciseness due to such over-determination. The precise movement and/or positioning based on the exactly three engaging regions $28_1$, $28_2$ and $28_3$ allows for a precise and reliable sealing of the interior 18 in the second position 12b.

By way of example, the moving direction 32 may be a vertical direction, i.e., the lifting system 26 may lift, carry or vertically move the container 12 by underpinning, i.e., supporting the container 12 at the exactly three engaging regions $28_1$, $28_2$ and $28_3$. A respective force to counteract the weight force so as to move the container 12 among the moving direction 32 may be applied at the engaging region $28_1$, $28_2$ and/or $28_3$. According to examples, the moving direction 32 may be directed towards any other direction in space, for example, a partially or completely horizontal direction instead of the illustrated vertical direction.

The lifting system 26 may comprise mechanical elements $34_1$, $34_2$, $34_3$ that engage the container 12 at the engaging regions $28_1$, $28_2$, $28_3$, respectively. The mechanical elements $34_1$, $34_2$ and $34_3$ may each be static or movable with respect to the container 12. For example, a location of the engaging region $28_1$, $28_2$ and/or $28_3$ may vary at the container 12 so as to implement a moveable engaging region. In contrast, such a location may be static with respect to the printing system 10.

Commonly, movement of the container 12 including a rotation thereof may be limited or constrained at the exactly three engaging regions $28_1$, $28_2$ and $28_3$. That is, the engaging regions $28_1$, $28_2$ and $28_3$ that may also be referred to as datumings and may constrain movement of the container 12 whilst avoiding over-determination of the mechanical system. That is, the lifting system 26 may non-hyperstatically constrain a movement of the container 12.

In other words, a datuming system to move the container may be designed with exactly three contacting points/regions at the container so as to guarantee stability of the system and position.

Figure 2:
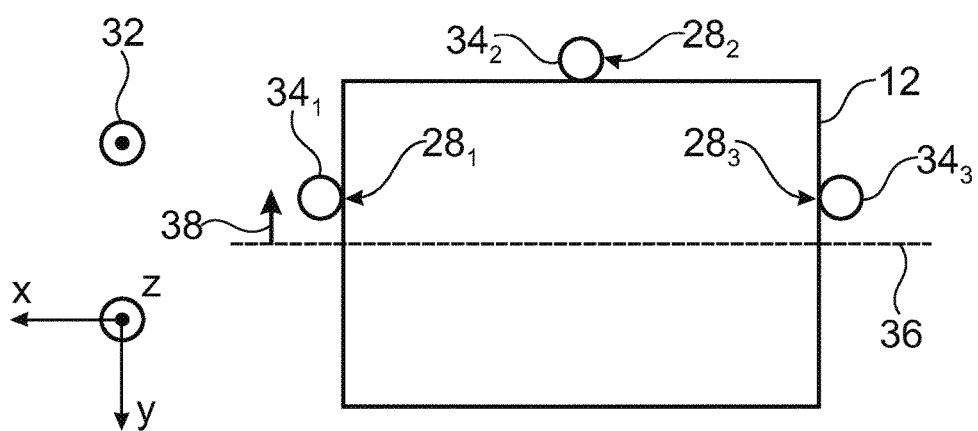
FIG. 2 shows a schematic top view of a container of an example printing system, being engaged by mechanical elements at associated engaging regions.

FIG. 2 shows a schematic top view of the container 12 being engaged by the mechanical elements $34_1$, $34_2$, $34_3$ at the engaging regions $28_1$, $28_2$, $28_3$, respectively. The moving direction 32 may be in parallel with a z-direction of a coordinate system such as a Cartesian coordinate system, wherein examples may implement any other coordinate system. Directions x and y of the Cartesian coordinate system may span a x/y-plane. For example, the lifting system, i.e., the mechanical elements $34_1$, $34_2$ and $34_3$ may constrain or hamper a movement of the container 12 in the x/y-plane in the position 12b. For example, the container 12 may be supported by the mechanical elements $34_1$, $34_2$ and $34_3$ at the exactly three engaging regions $28_1$, $28_2$ and $28_3$ being spaced apart from each other and being arranged on different sides of the container 12, e.g., three of four sides when assuming the container 12 as quadrangular. That is, a fourth side of the assumed quadrangle may remain unengaged. Such assuming may be transferred to the container 12 even if the container 12 comprises a shape being different from a quadrangle, e.g., a triangle, a pentagon or a polygon of higher order, an ellipse or a different arbitrary shape.

Although two opposing engaging mechanical elements $34_1$ and $34_3$ may be arranged on a symmetry axis 36 that may be determined based on a center of gravity in the x/y-plane, the mechanical elements $34_1$ and/or $34_3$ may be arranged with an offset 38 from the symmetry axis 36, therefore inducing forces that may cause the container 12 so as to rotate around the symmetry axis 36. Such a rotation may be limited, prevented or constrained by use of the mechanical element $34_2$ engaging the container 12 at the engaging region $28_2$. The offset 38 may thus allow for a predetermined direction of the forces trying to rotate the container 12 allowing a clear and unambiguous side along which the mechanical element $34_2$ may be arranged so as to prevent such a rotation. Beside constraining the tilt around the symmetry axis 36 by use of the mechanical element $34_2$, a tilt around a direction perpendicular hereto, e.g., around the y-axis and/or around the z-axis may be obtained by underpinning, carrying or hinging the container 12 at the opposing engaging regions $34_1$ and $34_3$. That is, beside constraining an in-plane movement of the container 12 perpendicular to the lifting direction 32, the lifting system may constrain a tilt of the container.

Figure 3A:
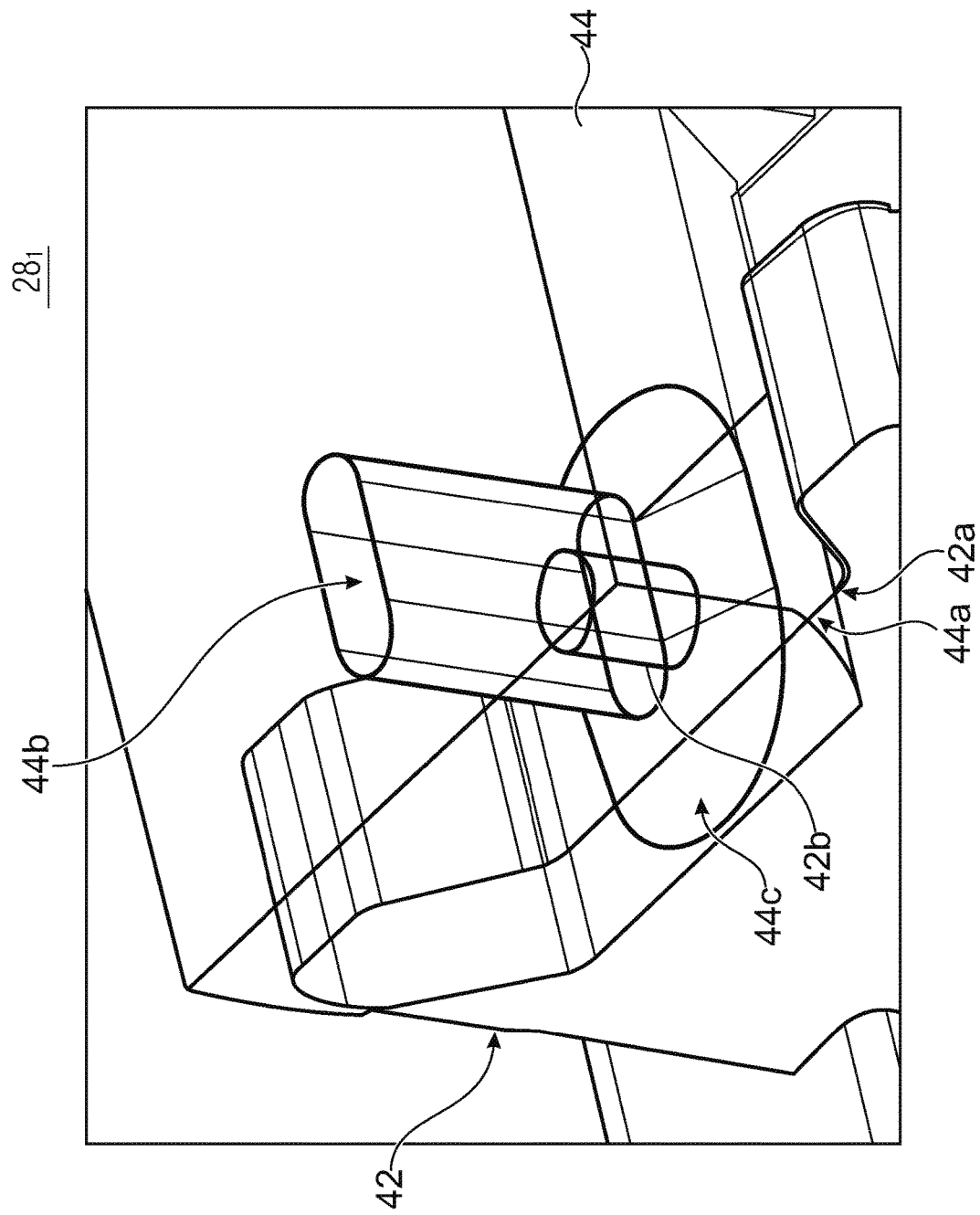
FIG. 3a shows a schematic perspective view of an example mechanical element of a first engaging region.

FIG. 3a shows a schematic perspective view of a mechanical element 42 that may be used, for example, as mechanical element $34_1$, $34_2$ or $34_3$. The mechanical element 42 may comprise a recess or emersion 42a at a side to be contacted with a part 44 of the container 12, e.g., a beam carrier or rigid mechanical element attached or mounted to the container 12.

The recess 32a may allow to prevent movement of the part 44 and thus of the container 12 along a y-direction. Alternatively or in addition, a bolt or pin 42b of the mechanical element 42 may be formed so as to correspond to a recess 44b of the part 44. The recess 42a may thus allow for a course positioning of the respective and associated shape 44a of the part 44, wherein bolt 42b in connection with recess 44b may allow for a fine positioning. Shape 44a in connection with recess 42a and/or recess 44b in connection with bolt 42b may allow for a movement of the container 12 along the x-direction. That is, beside carrying the container 12 with respect to the z-direction, the mechanical element 42 may be adapted so as to constrain movement of the container 12 along the y-direction whilst leaving a degree of freedom for a movement of the container 12 along the x-direction.

The part 44 may comprise a narrowing recess 44c that may be formed as a funnel or crater and that simplifies engagement of the mechanical element 42 with the part 44 by guiding the bolt 42b when engaging the part 44. For example, the mechanical element 42 may be lifted along a positive z-direction so as to start carrying the container 12. The mechanical element 42 may thus be a moveable part.

In other words, at the contacting region $38_1$, a datuming of the container may fix or constrain position along z and y but leave free a movement in x-direction.

FIG. 3b shows a schematic perspective view of an engaging region 28, e.g., the engaging region $28_3$. The engaging region $28_3$ may be formed as described for the engaging region $28_1$ of FIG. 3a, i.e., the mechanical element 42 may comprise a similar shape as in the engaging region $28_1$, wherein the mechanical element may also be formed differently. The engaging region $28_3$ may be formed so as to constrain the movement of the part 44 in the x/y-plane, i.e., along both directions x and y. For example, the recess 44b of FIG. 3a may be formed as a narrower recess 44b' having a shape corresponding to a shape of the bolt 44b.

In other words, a datum $28_3$ may fix or constrain a position along x and y-direction.

Figure 3C:
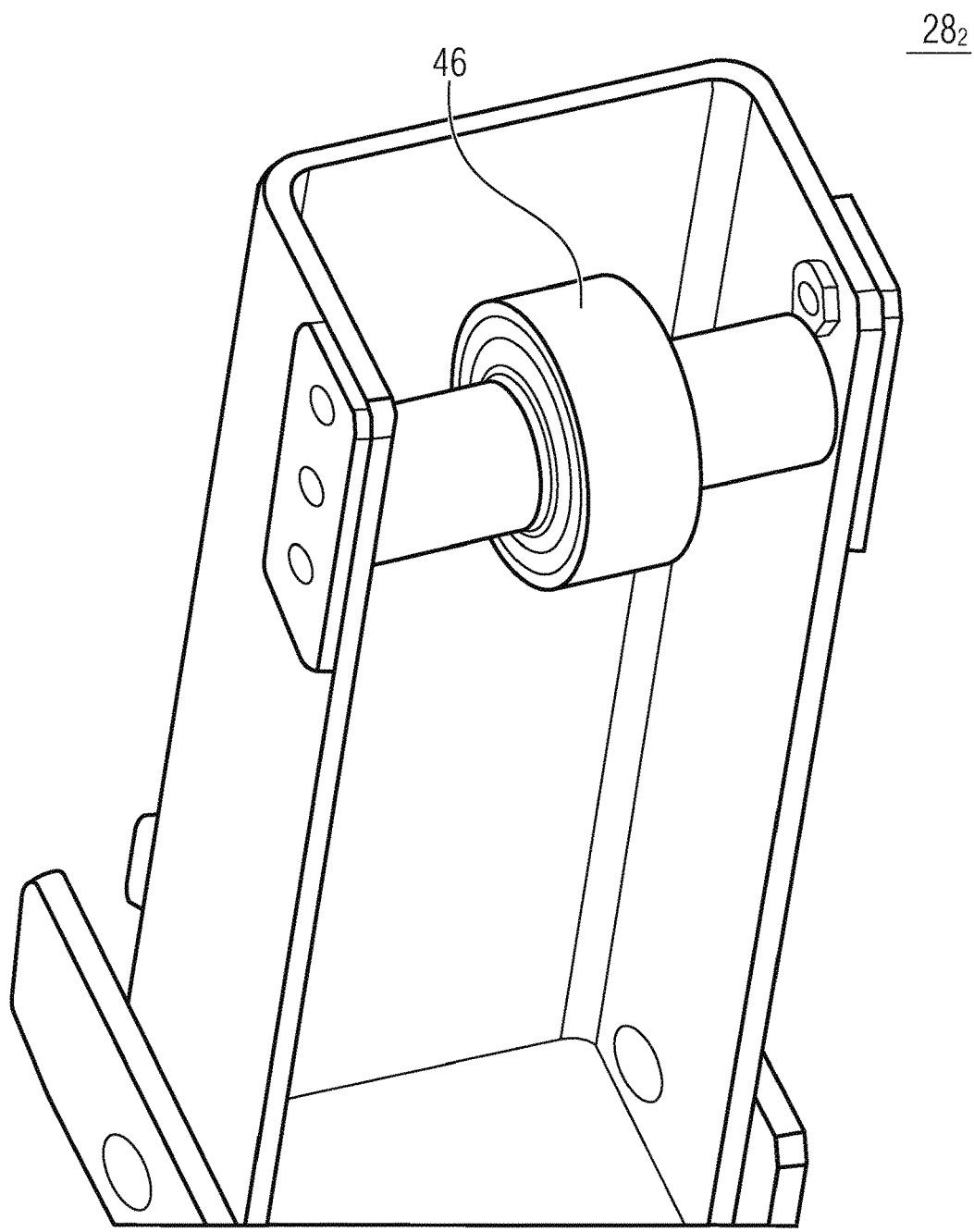
FIG. 3c shows a schematic perspective view of an example mechanical element of a third engaging region.

FIG. 3c shows a schematic perspective view of a further engaging region, e.g., the engaging region $28_2$. The printing system, e.g., the lifting system 26, may comprise a mechanical element 46 being arranged static with respect to a x/y/z position within the printing system such that the container 12 moving within the printing system based on an actuation of the lifting system is contacted at a variant location of the container 12 with the mechanical element 46. For example, the mechanical element 46 may comprise a guidance and/or a bearing such as a roller bearing or a cam follower to guide the movement of the container by engaging the container at the engaging region $28_2$. The mechanical element 46 may allow the container 12 to roll or guide or move along the lifting direction, e.g., z. To avoid constraints, the container 12 may also be allowed to move along the x-direction that is prevented from a tilt around the x-direction. A movement of the container along positive or negative y-direction may, per se, be possible at the engaging region $28_2$ and may be limited based on a rigid property of the mechanical element 46 being rigidly arranged in the printing system. When referring again to FIG. 2, the offset 38 may provide a force that pushes the container 12 towards mechanical element 46, thereby preventing the tilt and a movement of the container along negative y-direction.

The engaging region $28_1$ of FIG. 3a and the engaging region $28_3$ of FIG. 3b together allow to carry the container, wherein the engaging region $28_2$ may engage the container at a moving engaging region of the container. The movement of the engaging region $28_2$ at the non-shown container 12 in FIG. 3c may follow a movement of the engaging regions $28_1$ and/or $28_3$.

In other words, a datum $28_2$ may exclusively constrain part of a movement along the y-direction providing a y-force to compensate a momentum acting on the container. With a datuming system as described in connection with FIGS. 3a, 3b and 3c, the print bucket, container, is precisely located with the minimum constraints.

Figure 4:
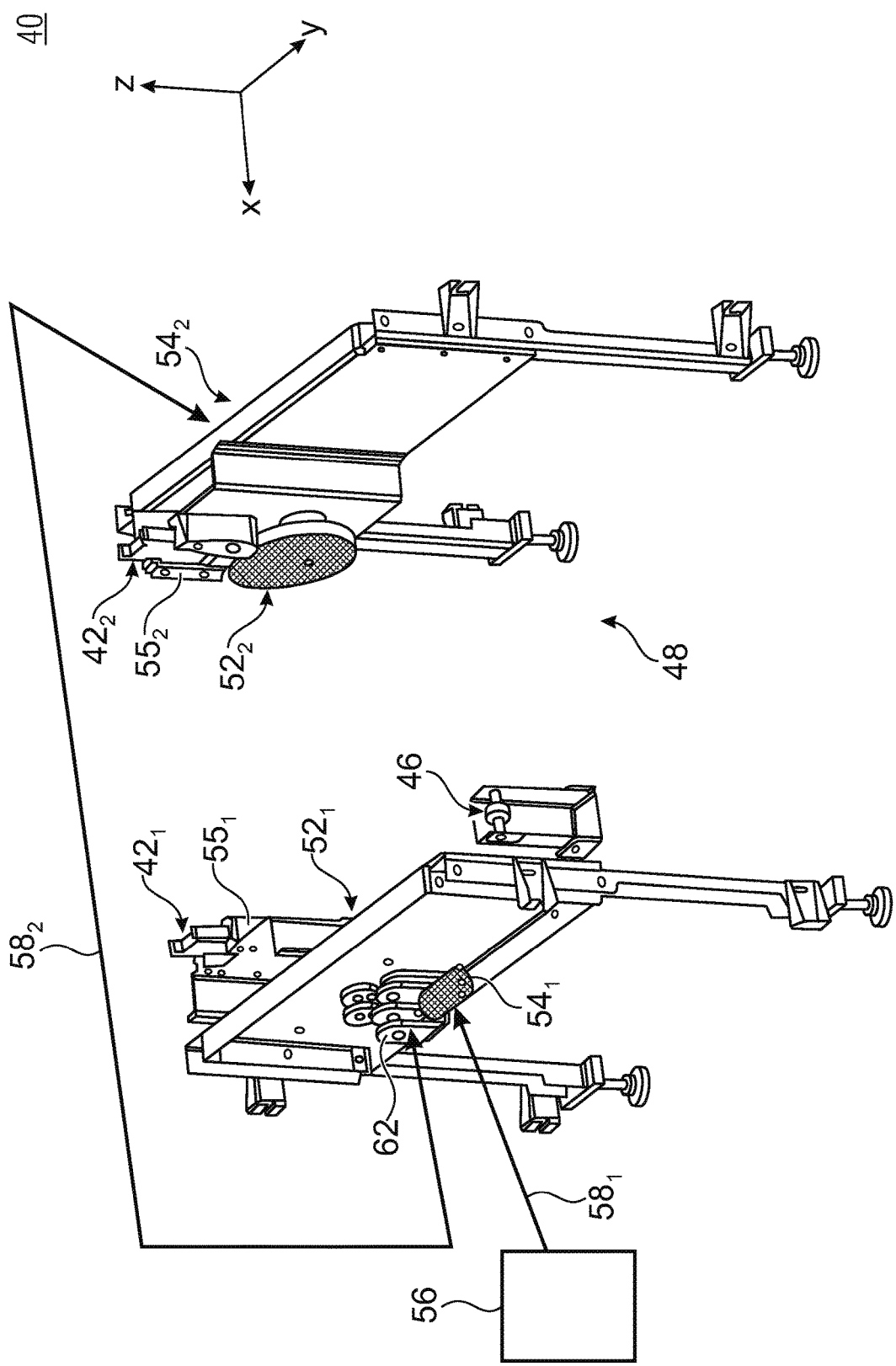
FIG. 4 shows a schematic view of a part of an example printing system that may receive the container at a receiving volume and that comprises mechanical elements so as to implement engaging regions as described in connection with FIGS. 3a and 3b.

FIG. 4 shows a schematic view of a part of a printing system 40 that may receive the container 12 at a receiving volume 48 and that comprises mechanical elements $42_1$ and $42_2$ so as to implement engaging regions $28_1$ and $28_3$ as described in connection with FIGS. 3a and 3b. The printing system 40 may further comprise the mechanical element 46 to as to implement the engaging region $28_2$ described in connection with FIG. 3c when engaging with the container 12 that is not shown.

The printing system 40 may comprise moving elements $52_1$ and $52_2$ to move the mechanical elements $42_1$ and $42_2$ based on their movement. Guidance elements $51_1$ and/or $55_2$ may be used to guide a movement of the mechanical elements $42_1$, $42_2$ respectively so as to provide for a one-dimensional movement of the mechanical elements.

For example, the parts $52_1$ and $52_2$ may be formed as cams rotably moved or actuated by use of actuators or motors $54_1$ and $54_2$. The motors $54_1$ and $54_2$ may move, e.g., rotate the cams $52_1$ and $52_2$ so as to provide for engagement with the container 12, e.g., by moving/actuating and thus using the mechanical elements $42_1$ and $42_2$ at the respective engaging regions. A control unit 56 of the lifting system may provide for a control signal $58_1$ to control the motor $54_1$ and/or may provide a control signal so to drive motor $54_2$. For example, the control signal $58_1$ may control the motor $54_1$ to certain speed, movement or the like.

According to an example, the control unit 56 may control one of both motors directly with the control signal $58_1$. The printing system 40 may comprise an encoder 62 that may encode a movement of the motor $54_1$ to obtain a movement signal. The motor $54_2$ may be controlled based on the movement signal 582 so as to obtain a synchronized movement of the motors $54_1$ and $54_2$. The control signal 582 for controlling the motor $54_2$ may be generated, for example, with the encoder 62. Alternatively or in addition, the movement signal may be provided to the control unit 56 that in turn generates the movement signal 582.

In other words, the vertical guides $52_1$ and $52_2$ may comprise a cam follower, i.e., mechanical elements or engaging means 42, that are in contact with the respective cam. Further components of the structure may support the system. For example, two DC motors may be arranged, one on each cam. Further, a gear system may be implemented so as to drive the cam with the motor. The cam may be moved with a motor such as DC motor in connection with an encoder 62. Using two motors in connection with an encoder allows to avoid a use of a synchronization mechanism between the two cams 52. According to an example, one motor may be set to a constant speed, while the second is set to follow the encoder with the first motor. With this concept, all the time the build unit may be stable and can be lifted.

FIGS. 5a and 5b show schematic side views of the printing system 40 of FIG. 4 to illustrate two different states of the cam $52_1$, wherein the explanations given also relate to the cam $52_2$. The cam $52_1$ may be formed as an eccentric body that is rotatable around an axis of rotation 64 such that by rotating the cam $52_1$ a surface 52a provides for a varying distance with regard to a datum or reference point, e.g., a reference position of the container 12 or the mechanical element $42_1$. For example, the surface 52a may be a lateral surface of the cam $52_1$ when regarding the cam $52_1$ as a cylindrical body having the lateral surface, a top surface and a bottom surface. Thereby, rotation of the cam $52_1$ provides for a movement of the mechanical element $42_1$ along the moving direction 32 as illustrated in FIG. 5b showing the mechanical element $42_1$ being lifted by a distance 66 being based on the eccentricity of the cam $52_1$.

By way of example, FIG. 5a shows a first end position of the cam $52_1$, the mechanical element $42_1$, the container 12, respectively, where the engaging region $28_1$ is lowered to a minimum so as to allow a movement of the container 12, the part 44 respectively over the mechanical element $42_1$. In FIG. 5b, there is shown a second end position, at which the position of the mechanical element $42_1$ may be increased to a maximum, thereby lifting the container 12. The cam $52_1$ may be non-uniformly eccentric with respect to the axis of rotation 64.

In other words, as there are only two vertical forces in datums $28_1$ and $28_3$, the vertical position of the print bucket may be supported with low efforts. This two vertical forces may be known and may thus lead to predetermined deformations and/or deformations that may be controlled. In particular, the deformation may remain without blockings or impreciseness in the sealing as the system remains non-hyperstatically carried. This may be used to control deformations, e.g., of the container that might lead to impreciseness in an over-determined system. Tilt of the container may be controlled by datum $28_2$. The printing system may use a cam in order to produce the vertical movement.

Figure 6A:
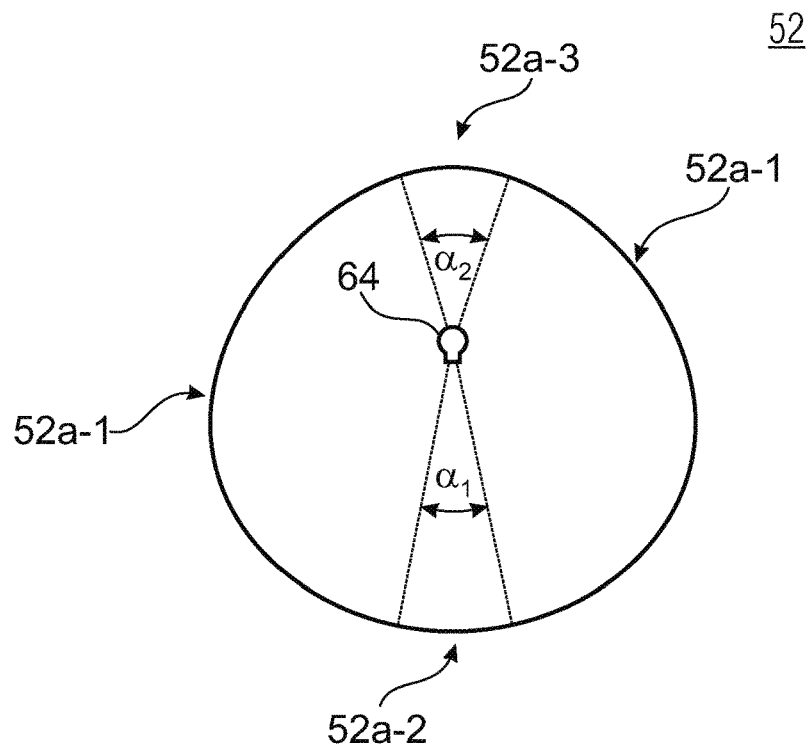
FIG. 6a shows a schematic side view of an example cam having a radial portion at the lateral surface.

FIG. 6a shows a schematic side view of the cam 52 that may be used as the cam $52_1$ and/or $52_2$. The lateral surface 52a of cam 52 may comprise a first surface area 52a-1 that allows to obtain a movement of the container 12 when varying or changing a position on the surface area 52a-1 that contacts with the container 12 or the mechanical element 42. For example, different positions of the lateral surface 52 in the surface area 52a-1 provide for a movement of the container 12 when rotating the cam 52.

The lateral surface 52 may comprise a different, second surface area 52a-2 that is shaped such that a rotation of the cam 52p provides for a constant distance with respect to the reference position, e.g., the mechanical element 42 or the container such that a rotation of the cam 52 within the boundaries of the surface area 52a-2 leads to a maintained positon of the container 12. The surface area 52a-2 allows to compensate for variations, deviations or impreciseness with regard to a control of the rotation of the cam 52, a control of the respective motor or the like. That is, an impreciseness of the movement of a motor may remain without inaccuracies in the containers position. This may allow for simple components to drive the container. Alternatively or in addition offsets, e.g., in a used encoder for driving a motor, may be compensated. For example, the surface area 52a-2 may be associated with the end position of FIG. 5a or FIG. 5b such that even if inaccuracies in view of a rotational position of the cam 52 occur, a precise position of the container 12 may be obtained.

An angle $\alpha_1$ that may be an opening angle that defines a lateral extension of the surface area 52a-2 and therefore a size of the lateral surface 52a-2 may be, for example, more than 0 degree and at most 360 degrees, at least one degrees and at most 180 degrees, or at least 5 degrees and at most 90 degrees.

The lateral surface 52 may comprise a further lateral surface area 52a-3 that provides for a similar functionality as the surface area 52a-2 at a different location of the surface area 52. For example, the surface area 52a-3 may be associated with a further end position of the container 12. For example, the surface areas 52a-2 and 52a-3 may oppose each other at the lateral surface 52a. An opening angle $\alpha_2$ defining a size of the lateral surface area 52a-3 may be same as the opening angle $\alpha_1$ but may also be different.

Although being described as connecting the mechanical element 42 with the lateral surface 52a, a different mechanical element or even the container 12 as such may be contacted with the lateral surface 52a of cam 52. Although FIG. 6a shows two surface areas 52a-2 and 52a-3 that allow for having a maintained position of the container 12 within the surface areas, one of such surface areas may be arranged on the lateral surface 52a in alternative examples. Alternatively, three, four or a higher number may be implemented, for example, so as to define a corresponding number of positions of the container that are to be controlled, including intermediate positions and end positions.

In other words, the cam 52 may be designed in order to have a cylindrical area on top and bottom, i.e., surface areas 52a-2 and 52a-3, to ensure the position of the build unit, even if a small error on the encoder or the control signal happens. The closed cam guarantees the safety of the operation and avoids hard stops.

Figure 6B:
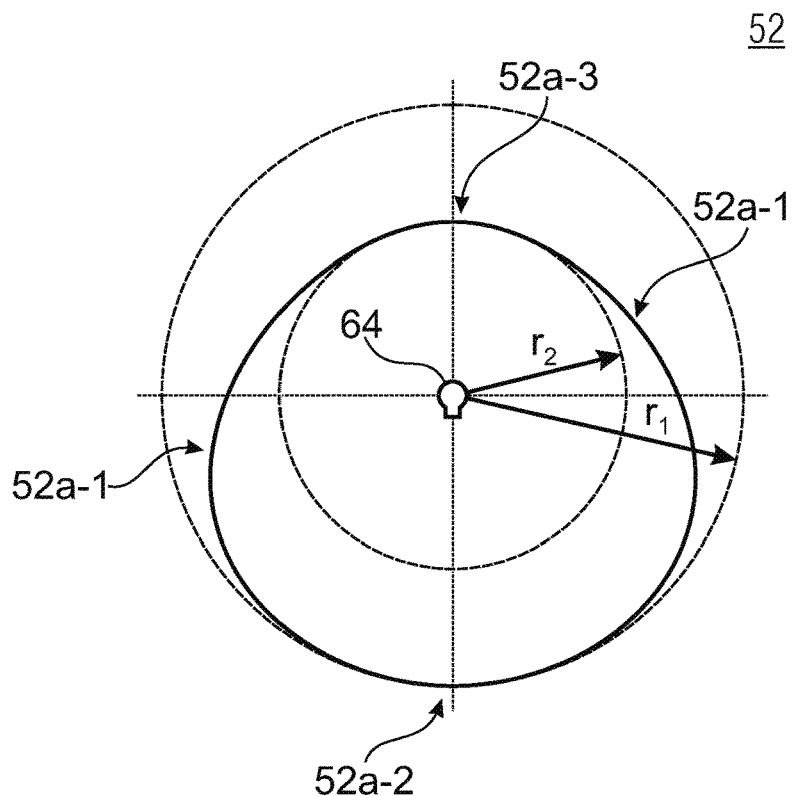
FIG. 6b shows a schematic side view of the cam corresponding to FIG. 6a describing a possible implementation of the cam.

FIG. 6b shows a schematic side view of the cam 52 corresponding to FIG. 6a describing a possible implementation of the cam 52 so as to obtain the described functionality. Whilst being formed non-uniformly eccentric in regions of the surface area 52ai and thus having a varying distance/radius with regard to the axis of rotation 64, the cam 52 may be formed radially with respect to the center of rotation at the surface areas 52a-2, 52a-3 respectively. The different surface areas 52a-2 and 52a-3 may comprise different radii $r_1$, $r_2$ respectively with respect to the center of rotation 64. According to an example, the radius $r_1$, $r_2$ respectively may form a continuous transition to the surface areas 52a-1. For example, such a shape may be understood as having an egg whose head and bottom are rounded, radially shaped.

Figure 7A:
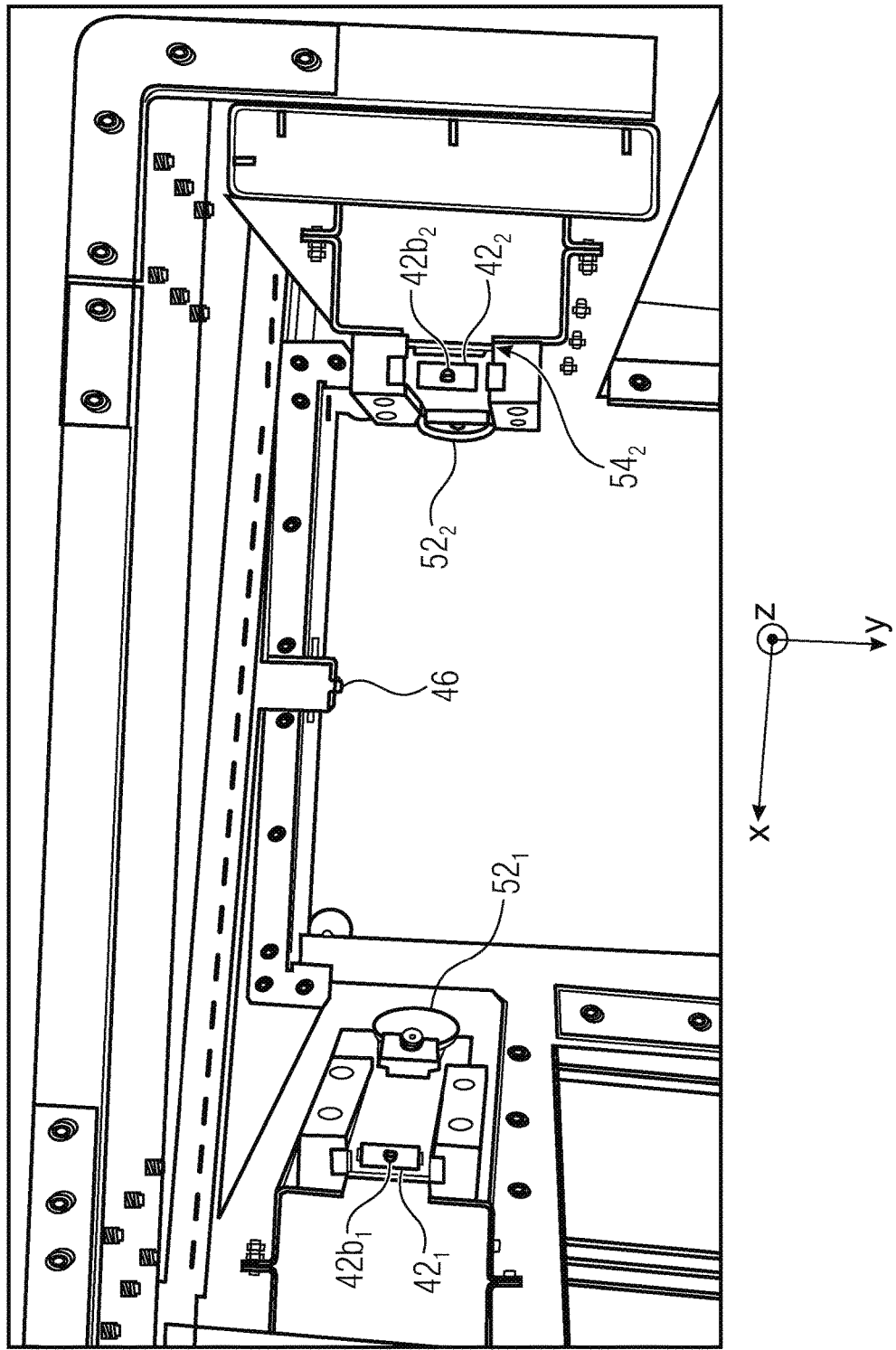
FIG. 7a shows a top view of an example printing system.

FIG. 7a shows a top view of an example printing system 70 comprising the mechanical elements $42_1$ and $42_2$ as well as the mechanical element 46 so as to form the exactly three engaging regions.

Figure 7B:
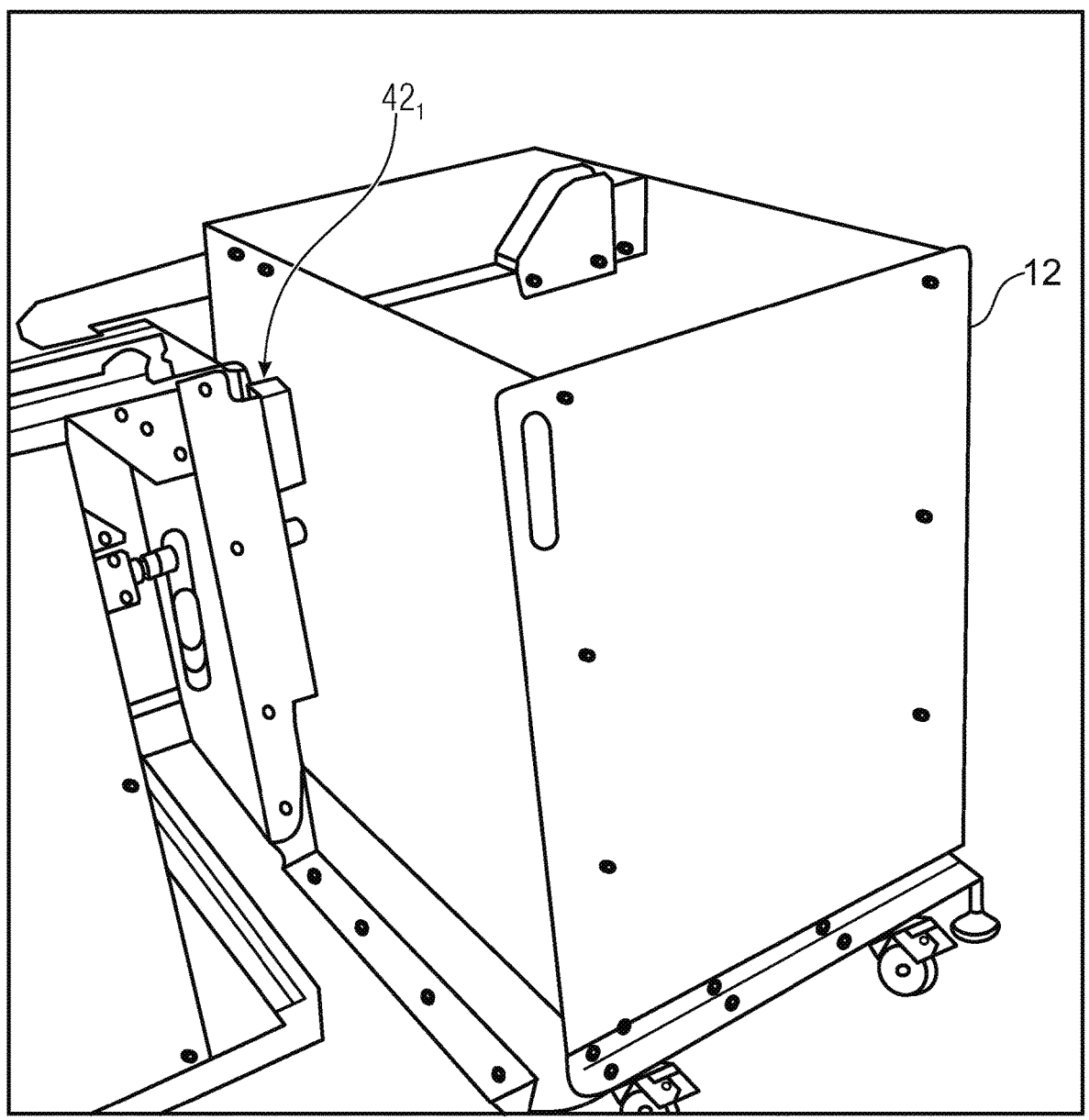
FIG. 7b shows an example photography of the printing system having an example container inserted.

FIG. 7b shows an example photography of the printing system 70 having an example container 12 inserted, wherein for the sake of illustration, the sealing and further components of the printing system such as a printing unit or the like are not shown.

Some examples described herein relate to a printing system that moves the container by engaging it at exactly three engaging regions. Alternatively or in addition, the lifting system may be adapted differently and may engage the container at a different number of engaging regions. The lifting system may comprise a first motor to move the container at a first engaging region and may comprise a second motor to move the container a second engaging region. The lifting system may comprise a controller to control the first motor, e.g., control unit 56, to control the first motor and may comprise an encoder such as the encoder 62 to encode a movement of the first motor to obtain a movement signal and to control the second motor placed on the movement signal. That is, using an encoder so as to obtain a synchronized movement may be implemented alternatively or in addition to using exactly three engaging regions.

Further, alternatively or in addition to implement exactly three engaging regions and/or alternatively or in addition to use the encoder, the lifting system may comprise a cam to convert a movement of an actuator, e.g., a motor 54, into a movement of the container. The cam may be arranged rotably around an axis of rotation. In a lateral surface of the cam may provide for a movement of the container, e.g., based on an axial varying distance with regard to the axis of rotation. During a rotation of the cam, a first surface area such as surface area 52a-1 of the lateral surface may provide for a displacement of the container and a second surface area such as surface area 52a-2 and/or 52a-3 may provide for a maintained position of the container when the cam is rotating.

That is, the aspect of using exactly three engaging regions, the aspect of using an encoder and the aspect of using a cam that has the radial surface areas may be implemented independently from each other but may also be combined in any combination with each other.

Examples allow to assure datuming and improving printing precision as well as making feasible the operation of moving the container into a sealed position without human help. The vertical movement may improve the sealing as it simplifies insurance of a good contact with the sealing. Further, synchronizing two motors via encoder and servos may ensure the position of the two contact points and may guarantee safety during operation as well as providing for a simple mechanism, avoiding the use of a mechanic synchronization system. As a printing material such as a metal powder may be dangerous for humans, the lifting mechanism may support automatization of the load system of the print bucket, i.e., the container, and may provide for a low amount of human intervention.

All of the features disclosed in the specification including any accompanying claims, abstract and drawings, and/or all the features of any method or progress described may be combined in any combination including any claim combination, except combinations where at least some of such features are mutually exclusive. In addition, features disclosed in connection with a system may, at the same time, present features of a corresponding method, and vice versa.

Each feature disclosed in the specification including any accompanying claims, abstract and drawings may be replaced by other features serving the same, equivalent or a similar purpose, unless expressly stated otherwise. Thus, unless expressly stated otherwise, each feature disclosed is one example of a generic series of equivalent or similar features.

The foregoing has described the principles, examples and modes of operation. However, the teaching herein is not to be construed as being limited to the particular examples described. The above-described examples are to be regarded as illustrative rather than restrictive, and it is to be appreciated that variations may be made in those examples without departing from the scope of the following claims.

What is claimed is:

1. A printing system to hold printing material, the printing system comprising:
    a sealing interface to seal a container with respect to a printing chamber volume of the printing system, the container to hold the printing material; and
    a lifting system to move a container between a first position in which the container is to be lifted and a second position at which the container is lifted and contacts the seal so as to seal the container, wherein the lifting system is to non-hyperstatically constrain the container.

2. The printing system of claim 1, wherein the lifting system is to support the container at exactly three constraining engaging regions of the container to non-hyperstatically constrain the container when moving the container.

3. The printing system of claim 2, wherein the lifting system is to vertically move the container, wherein the three constraining engaging regions form contact regions to be engaged by the lifting system.

4. The printing system of claim 1, wherein the lifting system comprises a first motor to move a first cam to provide for engagement of the container at a first engaging region and comprises a second motor to move a second cam to provide for engagement of the container at a second engaging region.

5. The printing system of claim 4, comprising an encoder to encode a movement of the first motor to obtain a movement signal, wherein the printing system is to control the second motor based on the movement signal to obtain a synchronized movement of the first motor and the second motor.

6. The printing system of claim 1, wherein the lifting system comprises a cam follower to guide a movement of the container by engaging the container at a third engaging region.

7. The printing system of claim 1, wherein the lifting system is to move the container along a lifting direction and to constrain an in-plane movement perpendicular to the lifting direction, and to constrain a tilt and a position of the container.

8. The printing system of claim 1, wherein a first engaging means to engage the container at a first engaging region and a second engaging means to engage the container at a second engaging region are to vertically carry the container, wherein a third engaging means is to engage the container at a moving third engaging region, a movement of the third engaging region following a movement of the first and/or second engaging means.

9. The printing system of claim 1, wherein the lifting system leaves a degree of freedom for a movement of the container at a first engaging region along a first lateral direction perpendicular to a lifting direction generated by the lifting system, constrains, at a second engaging region, a movement along the first lateral direction and a second lateral direction perpendicular to the lifting direction and the first lateral direction and constrains, at a third engaging region, a movement along the second lateral direction whilst allowing for a movement along the first lateral direction.

10. The printing system of claim 1, wherein a movement of the container generated by the lifting system is to seal a sealing of the printing system between the container and an environment thereof.

11. The printing system of claim 1, wherein the lifting system comprises a cam arranged rotably around an axis of rotation and a motor to rotate the cam around the axis of rotation to thereby move the container, and wherein a lateral surface of the cam comprises a first surface area along which a rotation of the cam provides for a movement of the container and comprises a second surface area along which the rotation of the cam provides for a maintained position of the container.

12. The printing system of claim 11, wherein a shape of the first surface area is non-uniformly eccentric with respect to the axis of rotation of the cam and wherein the second surface area is radially shaped with respect to the axis of rotation.

13. The printing system of claim 11, wherein the second surface area is associated with an end position of the container such that the cam engages with a mechanical element or the container with the second surface area at the end position of the container.

14. A printing system to hold printing material, the printing system comprising:
    a sealing interface to seal a container with respect to a printing chamber volume of the printing system, the container to hold the printing material; and
    a lifting system to move a container between a first position in which the container is to be lifted and a second position at which the container is lifted and contacts the seal so as to seal the container;
    wherein the lifting system comprises a first motor to move the container at a first engaging region and comprises a second motor to move the container at a second engaging region; and
    wherein the lifting system comprises a controller to control the first motor and comprises an encoder to encode a movement of the first motor to obtain a movement signal and to control the second motor based on the movement signal.

15. A printing system to hold printing material, the printing system comprising:
    a sealing interface to seal a container with respect to a printing chamber volume of the printing system, the container to hold the printing material;
    a lifting system to move a container between a first position in which the container is to be lifted and a second position at which the container is lifted and contacts the seal so as seal the container;

wherein the lifting system comprises a cam to convert a movement of an actuator into a movement of the container, the cam arranged rotably around an axis of rotation; and wherein a lateral surface of the cam is to provide for the movement of the container, wherein during a rotation of the cam a first surface area of the lateral surface provides for a displacement of the container and a second surface area of the lateral surface provides for a maintained position of the container.

\* \* \* \* \*